(No Model.) 4 Sheets—Sheet 1.

F. P. ROSBACK.
MACHINE FOR CUTTING LOZENGES.

No. 585,789. Patented July 6, 1897.

Witnesses:
Inventor:
Fredrick P. Rosback, (No Model.) 4 Sheets—Sheet 2.

F. P. ROSBACK.
MACHINE FOR CUTTING LOZENGES.

No. 585,789. Patented July 6, 1897.

Witnesses:

Inventor:
Fredrick P. Rosback.

(No Model.) 4 Sheets—Sheet 3.
F. P. ROSBACK.
MACHINE FOR CUTTING LOZENGES.
No. 585,789. Patented July 6, 1897.
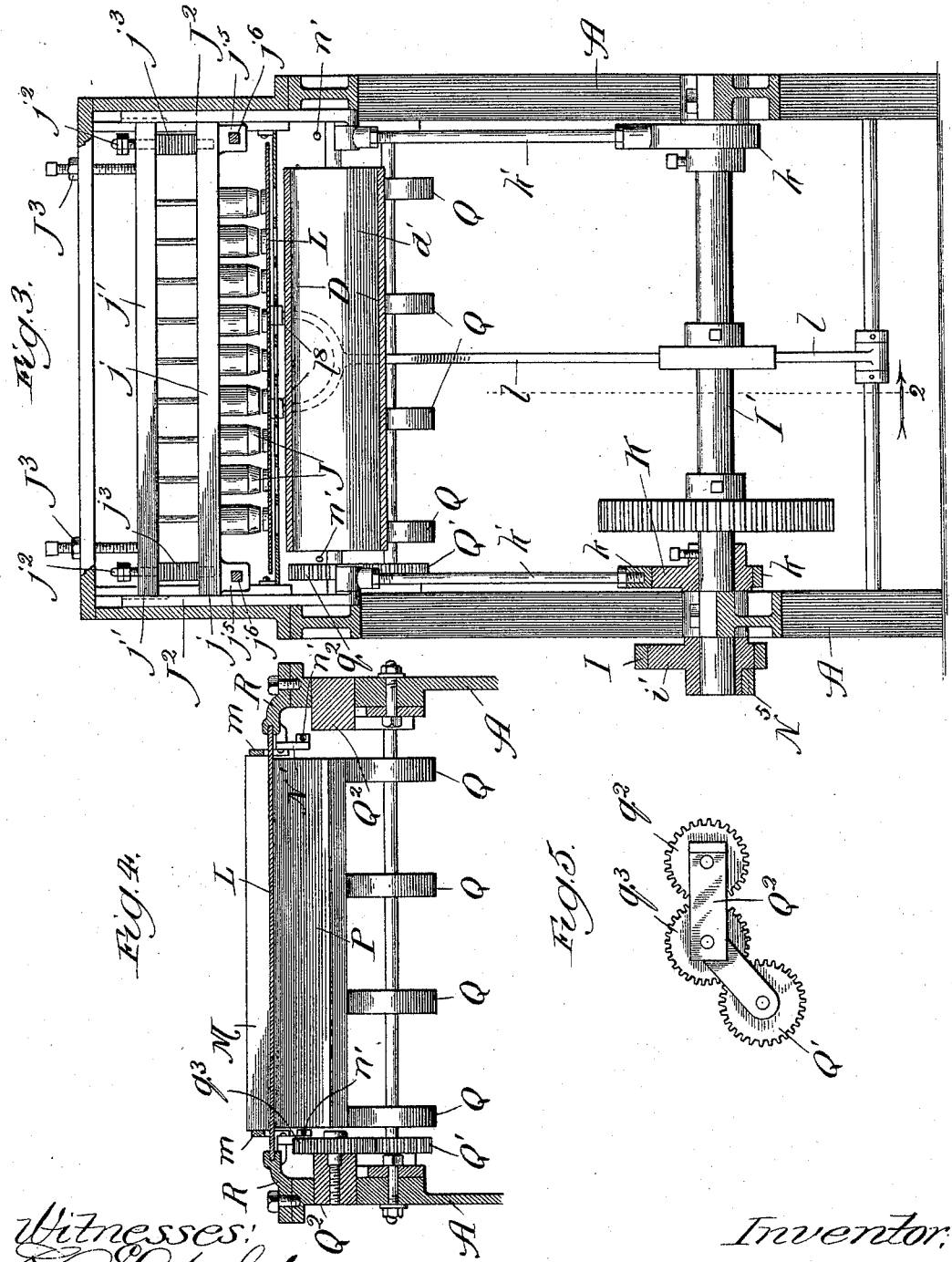

(No Model.) 4 Sheets—Sheet 4.

F. P. ROSBACK.
MACHINE FOR CUTTING LOZENGES.

No. 585,789. Patented July 6, 1897.

Witnesses: Inventor:
Fredrick P. Rosback,
By Banning & Banning & Sheridan,
Att'ys.

UNITED STATES PATENT OFFICE.

FREDRICK PETER ROSBACK, OF CHICAGO, ILLINOIS, ASSIGNOR TO THE PAN CONFECTION COMPANY, OF SAME PLACE.

MACHINE FOR CUTTING LOZENGES.

SPECIFICATION forming part of Letters Patent No. 585,789, dated July 6, 1897.

Application filed July 31, 1896. Serial No. 601,149. (No model.)

*To all whom it may concern:*

Be it known that I, FREDRICK PETER ROSBACK, a citizen of the United States, residing at Chicago, Cook county, Illinois, have invented certain new and useful Improvements in Machines for Cutting Lozenges, of which the following is a specification.

The object of my invention is to provide a simple, economical, and efficient mechanism for automatically cutting, forming, and embossing lozenges and discharging them upon a board; and the invention consists in the features, combinations, and details of construction hereinafter described and claimed.

Figure 1:
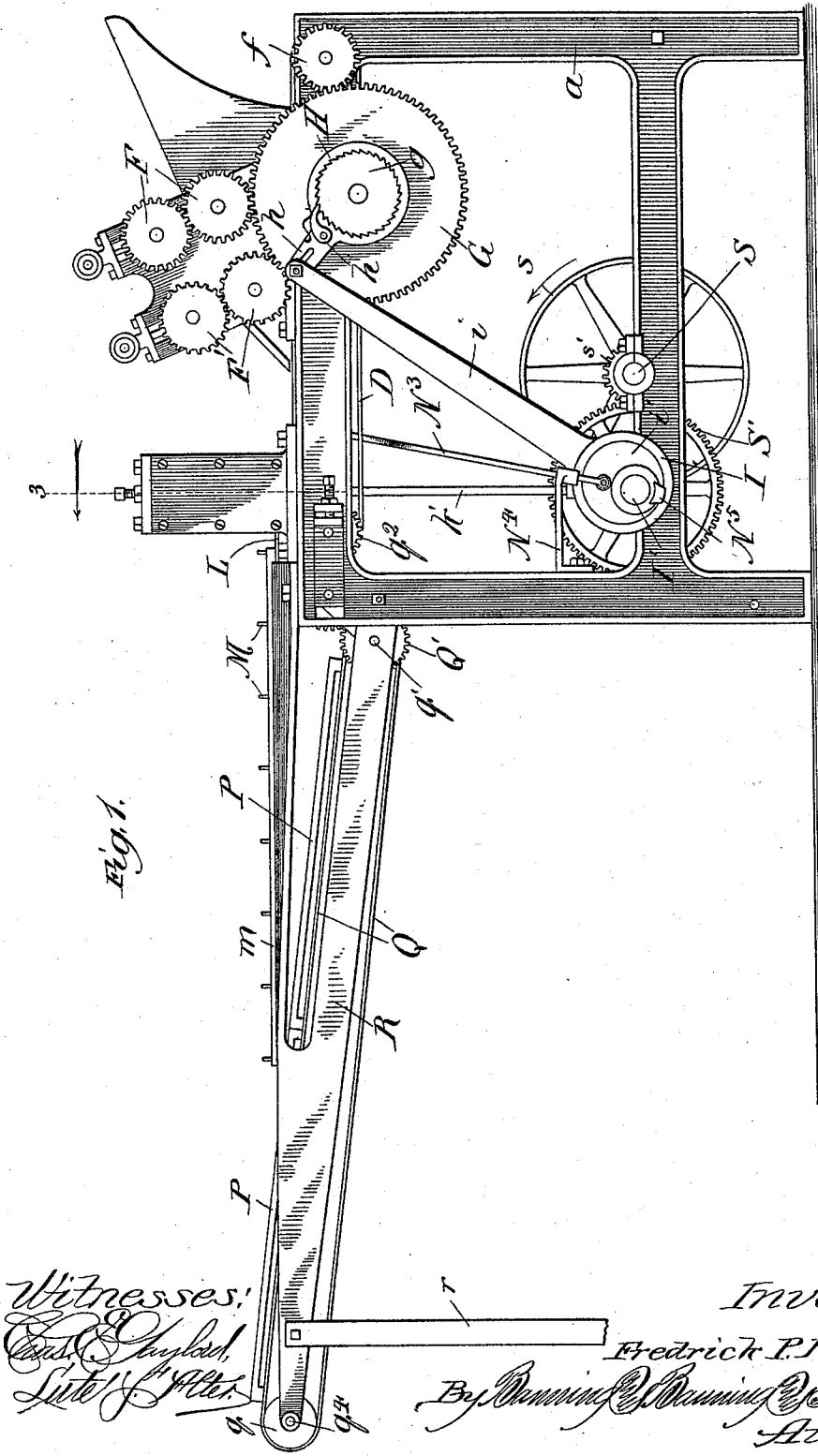
Figure 2:
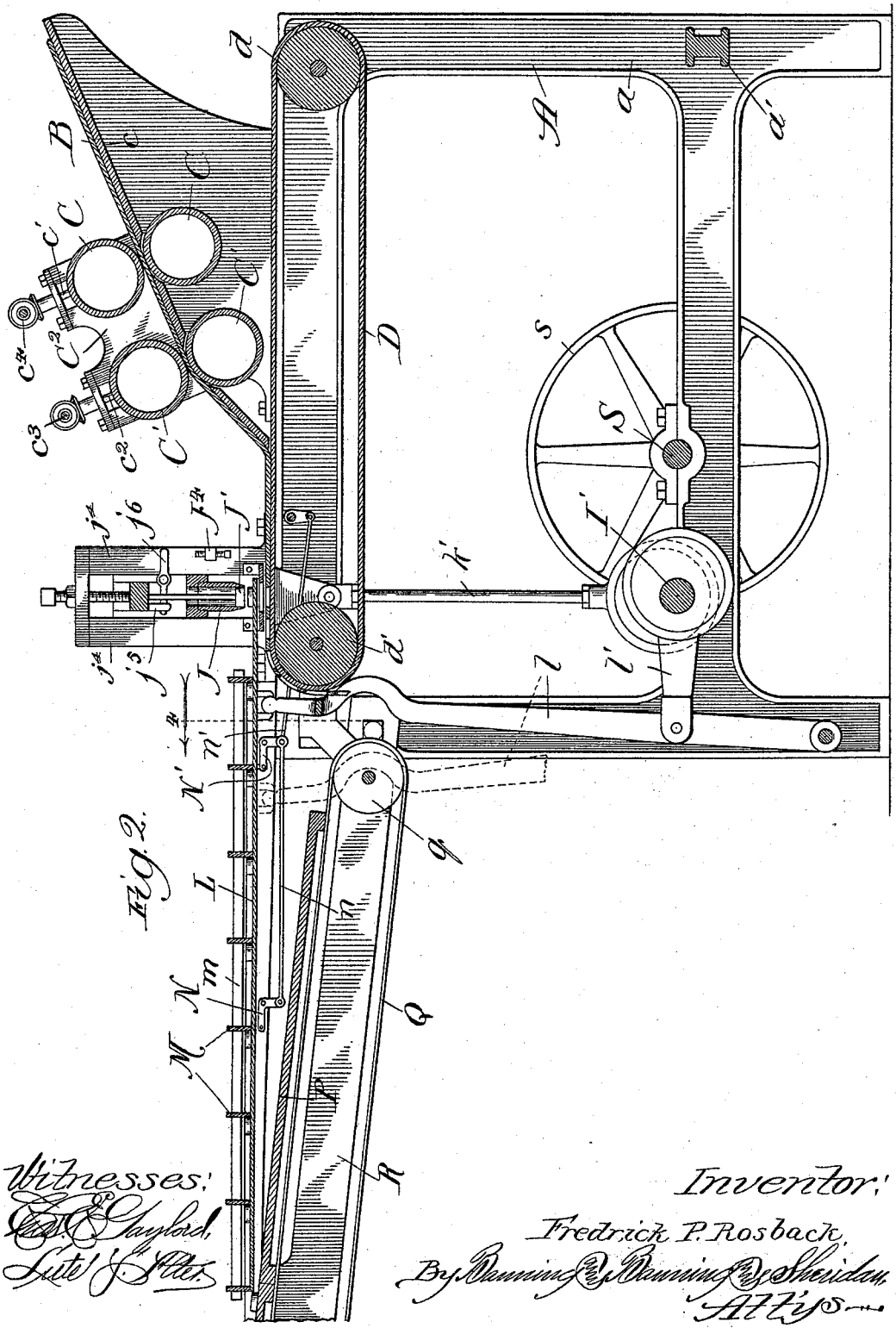
Figures 6, 7, 8:
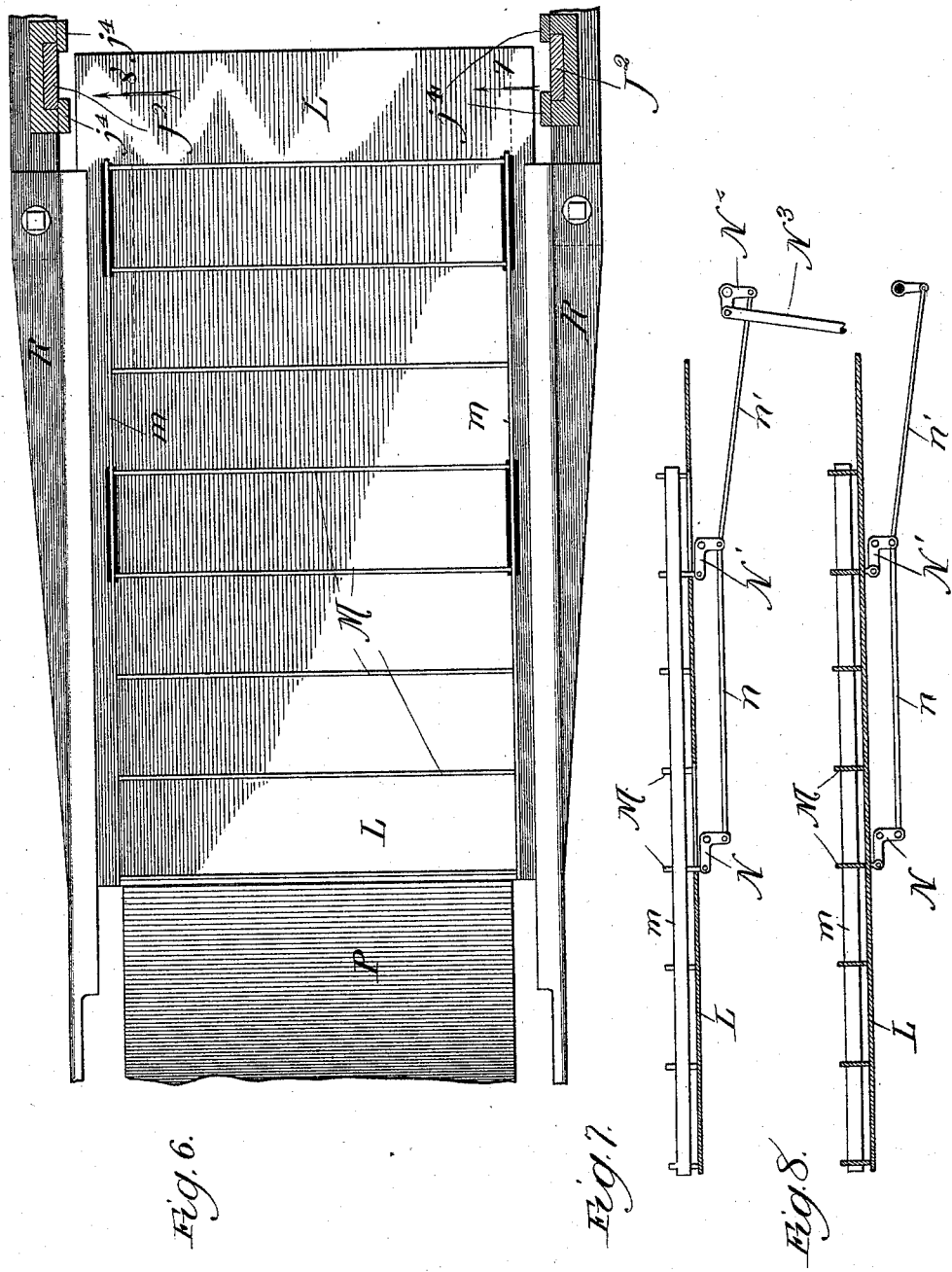

In the accompanying drawings, Figure 1 is a side elevation of a machine fitted with my improvements; Fig. 2, a vertical sectional elevation taken on the line 2 of Fig. 3, looking in the direction of the arrow; Fig. 3, a transverse vertical sectional elevation taken on the line 3 of Fig. 1, looking in the direction of the arrow; Fig. 4, a transverse sectional view of a portion of the machine, taken on the line 4 of Fig. 2. Fig. 5 is an end elevation of the gear mechanism for transmitting power and speed to the board-feeding belts hereinafter fully described; Fig. 6, a plan view of the reciprocating table and discharging or scraping mechanism hereinafter described; Fig. 7, a longitudinal sectional view taken on the line 7 of Fig. 6, and Fig. 8 a similar view taken on the line 8 of Fig. 6.

In constructing a machine in accordance with my improvements I make a frame A of the desired shape, size, and strength to support and hold the operative parts firmly in position. This frame portion consists, preferably, of two rectangular leg portions $a$, that are firmly tied together by means of a series of bolts and cross-bars $a'$, which act to make it practically one integral and stiff frame.

To size and feed the candy-dough B forward in position to be operated on, I provide two pairs of feed-rolls consisting of primary rolls C C, which first contact the dough and reduce it to a sufficient amount, and a second set of rolls $C'$ for reducing the dough to the desired thickness or size and feed it forward the required amount. These rolls are mounted on an inclined frame $C^2$, which is provided with an inclined table $c$, down which the dough is fed. Adjusting-screws $c'$ and $c^2$ are provided to contact the upper boxes of each set of feed-rolls, and are further provided with beveled gear mechanism $c^3$ $c^4$ for imparting a simultaneous movement to the boxes at each end of each pair of rolls, so as to move each upper roll vertically and parallel with relation to its lower roll. This mechanism, however, is well understood by those skilled in the art, so that a detailed description or drawing is unnecessary. The dough as it is fed from the feeding and sizing rolls is caught by a movable belt D, mounted upon a set of rolls $d$ $d'$.

To impart a step-by-step movement to the feed rolls and belt and feed or move the dough forward a desired amount each time, I provide each of the rolls with a set of intermeshing gears F and $F'$ and the roll $d$ of the feed-belt with a gear $f$. The lower gear of each pair of rolls and the gear F are engaged by a large driving-gear G, which is provided with a toothed ratchet $g$, mounted and secured to it, so as to have the same motion as the driving-gear. A reciprocating collar H is mounted concentrically upon a hub of the driving-gear and is provided with a lever-arm $h$, carrying a pawl $h'$. This lever-arm is slotted and engaged by the arm $i$ of an eccentric-strap I, that is mounted upon an eccentric $i'$ of the shaft $I'$, so that as such shaft rotates the outer end or arm $i$ reciprocates to move the lever-arm of the collar H through the portion of an arc of a circle, allowing its pawl $h'$ to slip over the ratchet-tooth during a backward movement and engage them during the forward motion and move the driving-gear a desired amount to obtain the necessary step-by-step motion of the feed rolls and belt. The main advantage of this mechanism is that by one adjustment of the eccentric-arm $i$ on the lever-arm adjusts the movement of the vibrating collar and both pairs of feed-rolls and the feed-belt at one and the same operation.

It will be noticed on close inspection of the drawings, particularly Fig. 1, that the pair of gears for the primary set of feed-rolls have a larger number of teeth than those on the secondary rolls for the reason that it is necessary to give the second set of rolls a higher relative peripheral velocity in order to compensate for the difference of compression given the dough by each pair of rolls as it is fed through the same.

To cut and form the dough into the desired shape of lozenge, I provide a set of hollow punches J and mount the same upon a crossbar $j$. A second cross-bar $j'$ is provided carrying a set of piston ejectors $J'$, one of which is inserted in each of the hollow punches. These cross-bars are both mounted in a pair of vertically-movable slides $J^2$, that travel in ways $j^4$, and in order to hold said bars flexibly and the desired distance apart I provide two studs and nuts $j^2$ and helical coiled springs $j^3$ and insert the springs between the bars, so that they may partake of a simultaneous vertical movement and yet allow the upper bar to have a different motion. A set of adjustable stops consisting of screws and lock-nuts $J^3$ are provided, so as to contact with the second cross-bar and limit its upward movement and during the continued movement of the first or lower cross-bar eject the completed lozenge that may have been cut out by the hollow punch. To give the necessary vertical movement to the movable slides and cross-bars, I provide the shaft $I'$ with eccentric K, one at each end thereof, having eccentric-straps $k$, that are pivotally connected by means of eccentric-rods $k'$ with each of the vertically-movable slides, so that during the rotation of the shaft the slides are moved up and down the required amount.

It is often desirable in the formation of lozenges to emboss the same, and it is necessary in order to make the articles of commercial value that the embossing be made regular with relation to the form or contour of the lozenge. In order to accomplish this result, I provide my ejectors $J'$ with an embossing-surface and arrange the parts to perform the embossing as follows: The second cross-bar, that carries the piston ejectors, is preferably provided with two downward-depending lugs $j^5$ and the slides with vibrating levers $j^6$, having one of the ends engage the depending lugs and the outer free end so arranged that during the downward movement of the slides they may contact the adjustable stops $J^4$, which impart to the second cross-bars and ejectors an accelerated downward movement at the desired time to press or emboss the lozenge, as desired.
To receive the cut and formed lozenge as it is ejected, I provide a reciprocating table L and operate it by means of a vibrating lever $l$, the upper end of which is forked and contacts with lugs $l^8$ on the lower portion of the table and an eccentric $l'$, which is pivotally connected with the operating-lever and which is mounted upon the operating-shaft $I'$. The parts are so arranged and timed that one end of the reciprocating table is moved forward (see Fig. 2) directly under the punches to receive the lozenge as it is ejected. In order to discharge the lozenge from the reciprocating table at the end farthest removed from the cutters, I provide a plurality of vertically-movable discharging-scrapers M, that are tied together at each end by means of side bars $m$. These discharging-scrapers are provided with a set of bell-crank lever-arms N N', connected together by means of rods $n$ and with a third bell-crank lever-arm $N^2$ by means of a connecting-rod $n'$. This third bell-crank lever is provided with a vertically-movable operating-rod $N^3$, movably mounted in a bearing-bracket $N^4$, secured to the frame of the machine. The lower end of this rod $N^3$ is arranged adjacent to the operating-shaft $I'$ in such manner that during the rotation of the operating-shaft a cam $N^5$ will contact and operate the same at the desired time, the arrangement being such that during the backward movement of the reciprocating table, when it is taking the lozenges away from the cutters, the rod will be operated to raise the discharging-scrapers, but during the forward motion of the reciprocating table the cam will have passed out of contact with the rod and the scrapers will be allowed to contact the reciprocating table to discharge the cut and completed lozenge onto the boards P. These discharging-scrapers are secured at distances from each other slightly less than the motion of the reciprocating table, so that there will be no danger of the scrapers coming down upon and destroying a formed lozenge.

To carry the boards P along that receive the lozenge, and upon which the lozenges are transported to the drying-room, and feed them at the desired times to the discharge end of the reciprocating table, a set of feed supporting-belts Q are provided mounted upon pulleys $q$, the belt traveling at an angle to the motion of the reciprocating table. The necessary step-by-step movement of this belt is obtained by providing the shaft $q'$, that carries one set of the pulleys Q with a spur-gear Q', that is operated by a spur-gear $q^2$ upon one of the dough-feeding cylinder-shafts by means of an intermediate gear $q^3$. The spur-gears $q^2$ and $q^3$ are mounted in boxes $Q^2$, so that during the tightening or loosening of the dough feed-belt both gears may be given a simultaneous movement. The shafts $q'$ and $q^4$, that carry the board feed-belts, are mounted upon a frame portion R, that is bolted to the main frame at one end and supported at the opposite end by means of legs or supports $r$.

To operate the mechanism, I provide a driving-shaft S, a pulley $s$, and spur-pinion $s'$, the spur-pinion engaging with a large gear S' upon the operating-shaft $I'$, this gearing being provided to increase the power and get a more efficient and uniform speed.

The principal advantages of my improvement are, first, that the mechanism is so simple that an ordinary unskilled operator may make all the necessary adjustments; second, the mechanism has but few parts and is consequently economical to construct and repair, and, further, the machine can be run at a higher speed and do more efficient work.

I claim—

1. In machines of the class described, the combination of mechanism for feeding the dough forward, mechanism for cutting and forming the lozenge, a reciprocating table for receiving the ejected lozenge, and a vertically-movable scraper arranged to be moved up as the table is moved back and lowered to position to scrape the lozenge off the end away from the cutters as the table is moved forward, substantially as described.

2. In a machine of the class described, the combination of mechanism for feeding the dough forward, mechanism for cutting and ejecting the lozenge, a reciprocating table for receiving the ejected lozenge, and several vertically-movable scrapers for discharging the lozenge off the end of the table away from the cutters, and mechanism for moving the scrapers up when the table is moved back from the cutter and down into operative position when the table is fed forward, substantially as described.

3. In a machine of the class described, the combination of mechanism for feeding the dough forward, one or more hollow punches for cutting the dough and shaping the lozenge, a piston ejector for each punch, means for giving the punches and ejectors a simultaneous movement during a portion of their motions, mechanism for operating the ejectors to give them an accelerated downward movement to emboss or press the lozenge, and means for operating the ejectors to discharge the formed lozenge, substantially as described.

4. In a machine of the class described, the combination of mechanism for feeding the dough forward, a plurality of hollow punches mounted upon a vertically-movable cross-bar, a plurality of piston ejectors, one for each punch, mounted upon a second cross-bar, means for moving such cross-bars simultaneously, adjustable spring mechanism for positioning the bars, stop mechanism for arresting the movement of the second cross-bar to cause the ejection of the formed lozenge, lever mechanism engaging the second cross-bar, and adjustable stop mechanism to contact the lever mechanism and give the second cross-bar an accelerated movement during the downward motion to emboss or press a lozenge, substantially as described.

FREDRICK PETER ROSBACK.

Witnesses:
THOMAS F. SHERIDAN,
THOMAS B. MCGREGOR.